United States Patent
Zhang (10) Patent No.: US 11,847,116 B2
(45) Date of Patent: Dec. 19, 2023

(54) DISTRIBUTED DATABASE PREPROCESSING METHOD, AGENT LAYER, SYSTEM AND STORAGE MEDIUM

(71) Applicant: XI'AN ZHONGXING NEW SOFTWARE CO., LTD., Xi'an (CN)

(72) Inventor: Jun Zhang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 45 days.

(21) Appl. No.: 17/625,567

(22) PCT Filed: Jul. 13, 2020

(86) PCT No.: PCT/CN2020/101571
§ 371 (c)(1),
(2) Date: Jan. 7, 2022

(87) PCT Pub. No.: WO2021/008475
PCT Pub. Date: Jan. 21, 2021

(65) Prior Publication Data
US 2022/0292096 A1    Sep. 15, 2022

(30) Foreign Application Priority Data
Jul. 17, 2019    (CN) .......................... 201910647652.7

(51) Int. Cl.
*G06F 16/00* (2019.01)
*G06F 16/2453* (2019.01)
(Continued)

(52) U.S. Cl.
CPC .. *G06F 16/24539* (2019.01); *G06F 16/24552* (2019.01); *G06F 16/27* (2019.01)

(58) Field of Classification Search
CPC .......... G06F 16/24539; G06F 16/24552; G06F 16/27
See application file for complete search history.

(56) References Cited

U.S. PATENT DOCUMENTS 7,024,406 B1 *  4/2006  Kunisetty ............. G06F 16/245
                                                707/999.005
2003/0220941 A1   11/2003  Arnold et al.
(Continued)

FOREIGN PATENT DOCUMENTS

CN    104636131 A    5/2015
CN    104811488 A    7/2015
(Continued)

OTHER PUBLICATIONS

International Searching Authority. International Search Report and Written Opinion for PCT Application No. PCT/CN2020/101571 and English translation, dated Oct. 22, 2020, pp. 1-11.
(Continued)

*Primary Examiner* — Alexander Khong
(74) *Attorney, Agent, or Firm* — Vivacqua Crane, PLLC (57) ABSTRACT

Disclosed are a distributed database preprocessing method, a database proxy layer, a system and a non-transitory computer-readable storage medium. The distributed database preprocessing method, applied to a database proxy layer, may include: receiving a request corresponding to a prepared statement; and performing processing according to the request corresponding to the prepared statement and a session identifier cached in a prepared statement cache library, a session corresponding to the session identifier cached in the prepared statement cache library is a prepared statement session where a connection is successfully established between a client and a database.

15 Claims, 3 Drawing Sheets

(51) Int. Cl.
*G06F 16/27* (2019.01)
*G06F 16/2455* (2019.01)

(56) References Cited

U.S. PATENT DOCUMENTS

| | | | |
|---|---|---|---|
| 2006/0031189 A1* | 2/2006 | Muras | G06F 16/24524 |
| 2007/0136311 A1* | 6/2007 | Kasten | H04L 69/14 |
| 2012/0084315 A1* | 4/2012 | Schneider | G06F 16/24558 |
| | | | 707/769 |
| 2016/0140175 A1* | 5/2016 | Weyerhaeuser | G06F 16/24542 |
| | | | 707/718 |
| 2020/0186507 A1* | 6/2020 | Dhanabalan | H04L 63/029 |
| 2020/0327140 A1* | 10/2020 | Khillar | G06F 16/2282 |

FOREIGN PATENT DOCUMENTS

| | | |
|---|---|---|
| CN | 105141676 A | 12/2015 |
| CN | 107370818 A | 11/2017 |
| WO | 2016091068 A1 | 6/2016 |

OTHER PUBLICATIONS

European Patent Office. Extended European Search Report for EP Application No. 20839782.8, dated Jul. 12. 2022, pp. 1-8.

\* cited by examiner

DISTRIBUTED DATABASE PREPROCESSING METHOD, AGENT LAYER, SYSTEM AND STORAGE MEDIUM

CROSS-REFERENCE TO RELATED APPLICATIONS

This application is a national stage filing under 35 U.S.C. § 371 of international application number PCT/CN2020/101571, filed Jul. 13, 2020, which claims priority to Chinese patent application No. 201910647652.7, filed Jul. 17, 2019. The contents of these applications are incorporated herein by reference in their entirety.

TECHNICAL FIELD

The present disclosure relates to the field of database technologies, and more particularly, to a distributed database preprocessing method, a database proxy layer, a system and a non-transitory computer-readable storage medium.

BACKGROUND

A prepared statement is a general term for prepare, execute, and deallocate statements, which is similar to a storage process and is a collection of SQL statements running in the background. Compared with a just-in-time SQL statement, the prepared statement divides an SQL statement into two parts, of which a first part is the same command and structure part, and the second part is a variable data part that follows. During execution of the SQL statement, firstly, the same command and structure part is sent to a database (values in the SQL statement are replaced by placeholders, which may be regarded as templatization or parameterization of the SQL statement), and the database performs preprocessing (including lexical semantic parsing, statement optimization, planning execution, etc.) once in advance. Then, only parameter data is sent when a prepared statement is executed. Advantages of prepared statements can be summarized as: one preprocessing, multiple runs, which eliminates parsing and optimization processes. In addition, the prepared statement can prevent SQL injection.

Distributed databases currently support preprocessing, but each prepared statement is sent to an underlying database and a current session is maintained. The session will not be deallocated until the preprocessing ends. Therefore, a lot of resources are be consumed, and frequent delivery of prepared statements to the database in high concurrency scenarios may increase the load of the database. As can be seen, the performance and efficiency of distributed database preprocessing are low.

SUMMARY

Some embodiments of the present disclosure provide a distributed database preprocessing method, applied to a database proxy layer, the distributed database preprocessing method including: receiving a request corresponding to a prepared statement; and performing processing according to the request corresponding to the prepared statement and a session identifier cached in a prepared statement cache library, where a session corresponding to the session identifier cached in the prepared statement cache library is a prepared statement session where a connection is successfully established between a client and a database.

Some embodiments of the present disclosure further provide a database proxy layer, including a receiving module and a processing module. The receiving module is configured to receive a request corresponding to a prepared statement. The processing module is configured to perform processing according to the received request corresponding to the prepared statement and a session identifier cached in a prepared statement cache library, where a session corresponding to the session identifier cached in the prepared statement cache library is a prepared statement session where a connection is successfully established between a client and a database.

Some embodiments of the present disclosure further provide a system, including a client, a database and the database proxy layer as described above. The client sends a request corresponding to a prepared statement to the database proxy layer. The database proxy layer performs processing according to the received request corresponding to the prepared statement and a session identifier cached in a prepared statement cache library, where a session corresponding to the session identifier cached in the prepared statement cache library is a prepared statement session where a connection is successfully established between a client and a database. The database maintains a connection to the session corresponding to the session identifier cached in the prepared statement cache library in the database proxy layer.

Some embodiments of the present disclosure further provide a non-transitory computer-readable storage medium, storing one or more programs which, when executed by one or more processors, cause the one or more processors to perform the distributed database preprocessing method as described above.

BRIEF DESCRIPTION OF DRAWINGS

The present disclosure is further described below with reference to the drawings and embodiments, in which.

DETAILED DESCRIPTION

In order to make the objectives, technical schemes and advantages of the present disclosure more comprehensible, the embodiments of the present disclosure are described in further detail below with reference to the embodiments and drawings. It should be understood that the embodiments described herein are intended only to illustrate the present disclosure, but not to limit the present disclosure.

Figure 1:
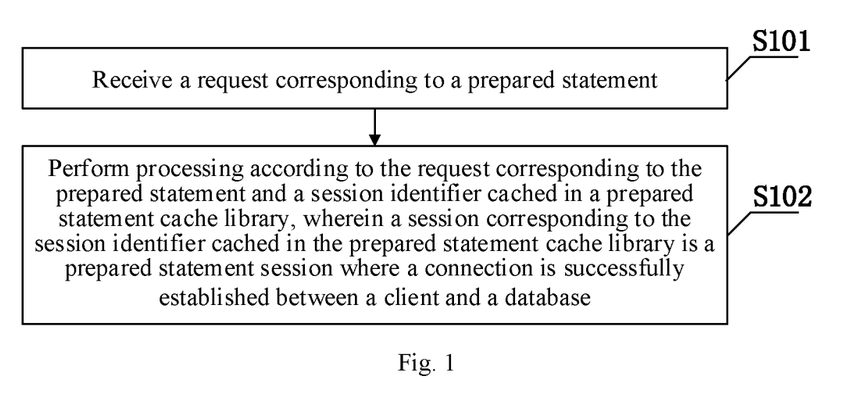
FIG. 1 is a basic schematic flowchart of a distributed database preprocessing method according to an embodiment of the present disclosure.

In order to solve the problem in the existing technology that performance and efficiency of distributed database preprocessing are low, in the embodiments of the present disclosure, a request corresponding to a prepared statement is received, and then processing is performed according to the request corresponding to the prepared statement and a session identifier cached in a prepared statement cache library. A session corresponding to the session identifier cached in the prepared statement cache library is a prepared statement session where a connection is successfully established between a client and a database. Referring to FIG. 1, as shown in FIG. 1, a basic flow of a distributed database preprocessing method according to an embodiment of the present disclosure includes S101 and S102.

At S101, a request corresponding to a prepared statement is received.

In this embodiment, the prepared statement includes, but is not limited to, prepare, execute and deallocate statements, which, in fact, is not specifically limited in the present disclosure provided that the prepared statement is within the protection scope of the present disclosure.

In order to better understand the present disclosure, this embodiment is illustrated with an example in which the prepared statement includes prepare, execute and deallocate statements.

At S102, processing is performed according to the received request corresponding to the prepared statement and a session identifier cached in a prepared statement cache library, where a session corresponding to the session identifier cached in the prepared statement cache library is a prepared statement session where a connection is successfully established between a client and a database.

It is to be noted that the session identifier in this embodiment is configured for uniquely identifying a session, which, for example, includes, but is not limited to, a session number. In practical applications, flexible adjustment may be made according to some application scenarios.

In this embodiment, when the request corresponding to the prepared statement received by a database proxy layer is a prepare request, the performing processing according to the received request corresponding to the prepared statement and a session identifier cached in a prepared statement cache library includes at least the following two situations.

Situation one: When a session identifier corresponding to a current prepare request session is found in the prepared statement cache library, a response message of the prepare request is sent to the client.

It may be understood that, when the prepare request is received and the session identifier corresponding to the prepare request session is cached in the prepared statement cache library of the database proxy layer, that is, the session identifier corresponding to the prepare request session is found in the prepared statement cache library, it indicates that the current prepare request has been processed. In this case, the response message of the prepare request is directly sent to the client, without the need to deliver the prepare request to the database, which saves the interaction between the client and the database and reduces the load of the database to some extent. It may be understood that the prepare request having been processed mentioned in this embodiment indicates that the prepare request has been sent to the database by the client once and a session has been successfully established. It is also to be clarified that the session corresponding to the session identifier cached in the prepared statement cache library in the database proxy layer is always connected to the database.

Situation two: when the session identifier corresponding to the current prepare request session is not found in the prepared statement cache library, the prepare request is sent to the database, and the database performs processing and sends the response message of the prepare request to the client.

It may be understood that, when the prepare request is received but the session identifier corresponding to the prepare request session is not cached in the prepared statement cache library of the database proxy layer, that is, the session identifier corresponding to the prepare request session cannot be found in the prepared statement cache library, it indicates that the current prepare request is not processed. In this case, the prepare request still may be delivered to the database for further processing.

In this embodiment, after the database proxy layer sends the prepare request to the database and the database performs processing and sends the response message of the prepare request to the client, the method further includes: caching the current prepare request session into the prepared statement cache library.

It may be understood that the session identifier in the prepared statement cache library of the database proxy layer is generally cached when the client sends it to the database for the first time and successfully establishes a session. In this way, when the client re-initiates the request corresponding to the prepared statement, the session identifier can be found in the prepared statement cache library of the database proxy layer, without the need to deliver the request corresponding to the prepared statement to the database, thereby saving an interaction operation between the client and the database. It is to be noted that the session identifier in the prepared statement cache library may also be cached when the client sends it to the database for the $N^{th}$ time and successfully establishes a session, where N is greater than 1. In practical applications, flexible adjustment is made by a developer according to an actual application scenario.

In some embodiments, after the database proxy layer sends the prepare request to the database and the database performs processing and sends the response message of the prepare request to the client, the current prepare request session is cached into the prepared statement cache library, so that the client only may interact with the database proxy layer a next time the client re-initiates the prepare request.

In this embodiment, when the request corresponding to the prepared statement received by the database proxy layer is an execute request, the performing processing according to the received request corresponding to the prepared statement and a session identifier cached in a prepared statement cache library includes at least the following two situations.

Situation one: When a session identifier corresponding to an idle prepare request session is found in the prepared statement cache library, the execute request is sent to the database, and the database performs processing and sends a response message of the execute request to the client.

It may be understood that, when the execute request is received and the session identifier corresponding to the idle prepare request session exists in the prepared statement cache library of the database proxy layer, that is, the session identifier corresponding to the idle prepare request session is found in the prepared statement cache library, the execute request is sent to the database in this case, and the database performs processing and sends the response message of the execute request to the client.

Situation two: When the session identifier corresponding to the idle prepare request session is not found in the prepared statement cache library, waiting is performed until an idle prepare request session is available, the execute request is sent to the database, and the database performs processing and sends the response message of the execute request to the client.

It may be understood that, when the execute request is received and the session identifier corresponding to the idle prepare request session does not exist in the prepared statement cache library of the database proxy layer, that is, the session identifier corresponding to the idle prepare request session cannot be found in the prepared statement cache library, and the execute request may be based on the prepare request which has been processed, in this case, waiting may be needed until the session identifier corresponding to the idle prepare request session is found in the prepared statement cache library. Further, the execute request is sent to the database, and the database performs processing and sends the response message of the execute request to the client.

In this embodiment, the database performing processing and sending the response message of the execute request to the client includes: receiving a result set or failure message generated after execution of the execute request by the database, and sending the result set or failure message to the client.

It may be understood that the database executes the execute request, and sends the generated result set or failure message to the client. The database proxy layer resends the result set or failure message to the client when receiving the sent result set or failure message.

In this embodiment, after sending the result set or failure message to the client, the method further includes: when the received request corresponding to the prepared statement is a deallocate request, performing processing and sending a response message of the deallocate request to the client.

It may be understood that the client may be disconnected from the database proxy layer as required. Therefore, the database proxy layer, when receiving the deallocate request, performs processing and sends the response message of the deallocate request to the client.

In this embodiment, the performing processing and sending a response message of the deallocate request to the client includes: deallocating a session corresponding to the prepared statement currently successfully established with the client, and sending the response message of the deallocate request to the client. In some embodiments, the prepare request session currently successfully established with the client may be deallocated, and the response message of the deallocate request is sent to the client, so as to further save resources.

In the distributed database preprocessing method according to the embodiment of the present disclosure, a request corresponding to a prepared statement is received, and processing is then performed according to the request corresponding to the prepared statement and a session identifier cached in a prepared statement cache library, where a session corresponding to the session identifier cached in the prepared statement cache library is a prepared statement session where a connection is successfully established between a client and a database, thereby solving the problem that performance and efficiency of distributed database preprocessing are low. That is, in the distributed database preprocessing method according to the embodiment of the present disclosure, a prepared statement session where a connection is successfully established between the client and the database is cached in the prepared statement cache library of the database proxy layer. The database proxy layer may perform processing according to the session identifier in the prepared statement cache library when receiving the request corresponding to the prepared statement, which prevents delivery of the prepared statement to the database by the client each time, thus leading to greatly reduced load of the database, greatly improved performance and efficiency of distributed database preprocessing, and saved resources.

Figure 2:
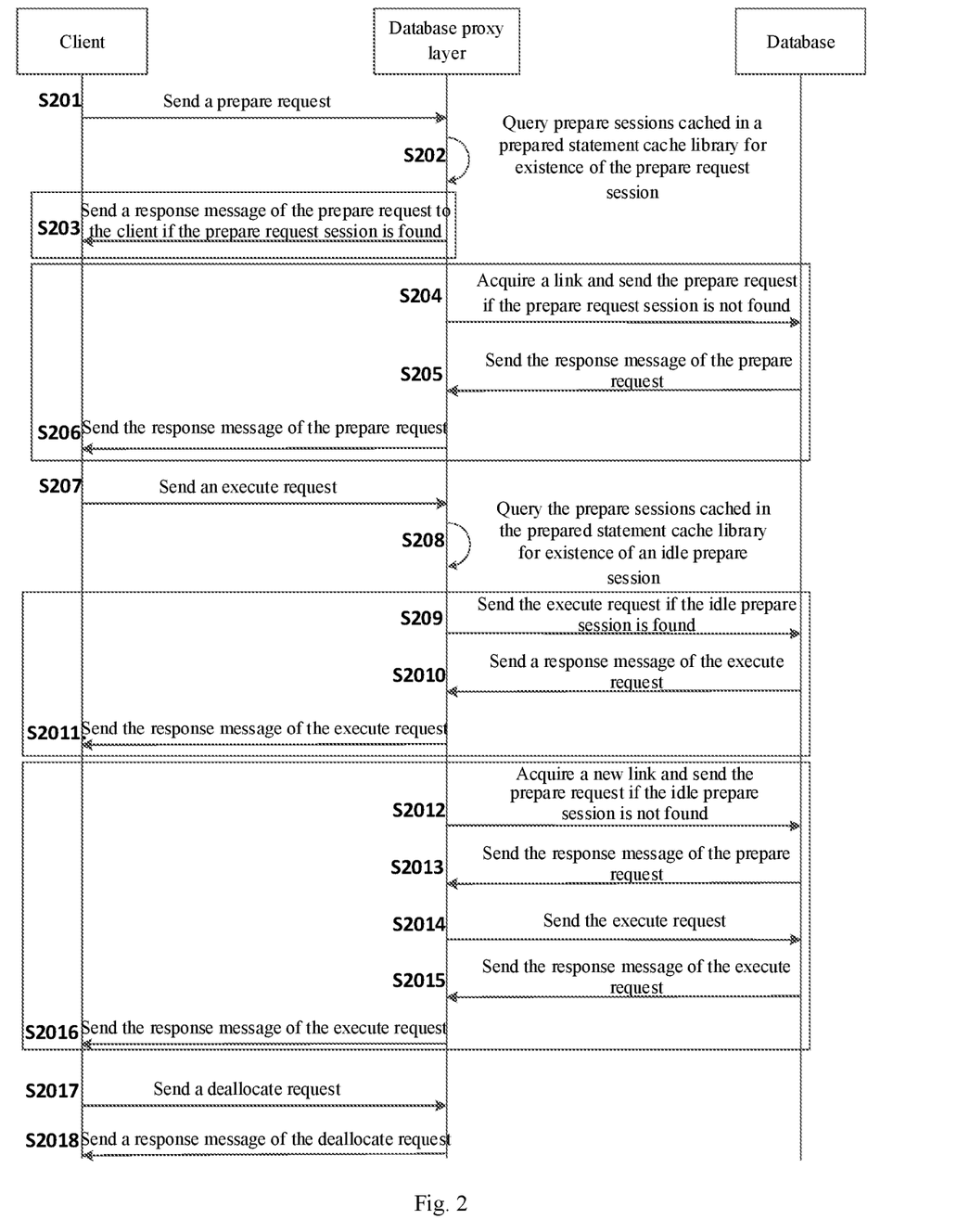
FIG. 2 is a schematic flowchart of a distributed database preprocessing method according to an embodiment of the present disclosure.

The embodiment of the present disclosure is further illustrated below by taking a distributed database preprocessing method as an example. Referring to FIG. 2, the flow includes the following S201, S202, S203, S204, S205, S206, S207, S208, S209, S2010, S2011, S2012, S2013, S2014, S2015, S2016, S2017 and S2018.

At S201, a client sends a prepare request to a database proxy layer.

At S202, the database proxy layer queries prepare sessions cached in a prepared statement cache library for existence of the prepare request session.

At S203, a response message of the prepare request is sent to the client if the prepare request session is found.

At S204, a link is acquired and the prepare request is sent to a database if the prepare request session is not found.

At S205, the database sends the response message of the prepare request to the database proxy layer.

At S206, the database proxy layer sends the response message of the prepare request to the client.

At S207, the client sends an execute request to the database proxy layer.

At S208, the database proxy layer queries the prepare sessions cached in the prepared statement cache library for existence of an idle prepare session.

At S209, the execute request is sent to the database when the idle prepare session is found.

At S2010, the database sends a response message of the execute request to the database proxy layer.

At S2011, the database proxy layer sends the response message of the execute request to the client.

At S2012, a new link is acquired and the prepare request is sent to a database if the idle prepare session is not found.

At S2013, the database sends the response message of the prepare request to the database proxy layer.

At S2014, the database proxy layer sends the execute request to the database.

At S2015, the database sends the response message of the execute request to the database proxy layer.

At S2016, the database proxy layer sends the execute response message to the client.

At S2017, the client sends a deallocate request to the database proxy layer.

At S2018, the database proxy layer sends a response message of the deallocate request to the client.

In the distributed database preprocessing method according to the embodiment of the present disclosure, the database proxy layer caches session identifiers corresponding to prepare request and execute sessions into the prepared statement cache library. In this way, a response message is directly returned when the prepare request is hit, saving the interaction between the client and the database. A session is acquired when the execute request is hit. Moreover, the session is deallocated when the processing ends, without having to occupying the current session all the time. Therefore, the utilization of the session is improved, thereby greatly improving the performance of distributed database preprocessing.

Figure 3:
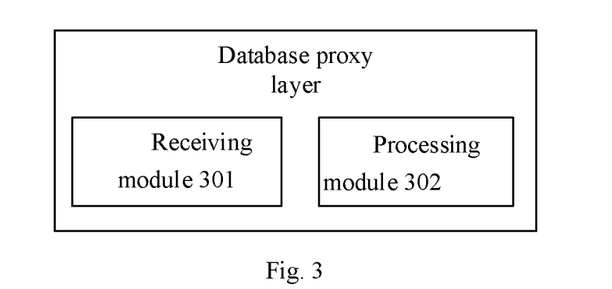
FIG. 3 is a structural schematic diagram of a database proxy layer according to an embodiment of the present disclosure.

In order to solve the problem that a motion vector and prediction residual may be encoded at the same time in an inter-frame prediction mode and the encoding performance is low, an embodiment of the present disclosure provides a database proxy layer, referring to FIG. 3.

The database proxy layer includes a receiving module 301 and a processing module 302.

The receiving module 301 is configured to receive a request corresponding to a prepared statement.

The processing module 302 is configured to perform processing according to the received request corresponding to the prepared statement and a session identifier cached in a prepared statement cache library, where a session corresponding to the session identifier cached in the prepared statement cache library is a prepared statement session where a connection is successfully established between a client and a database.

In this embodiment, the prepared statement includes, but is not limited to, prepare, execute and deallocate statements, which, in fact, is not specifically limited in the present disclosure provided that the prepared statement is within the protection scope of the present disclosure.

In order to better understand the present disclosure, this embodiment is illustrated with an example in which the prepared statement includes prepare, execute and deallocate statements.

It is to be noted that the session identifier in this embodiment is configured for uniquely identifying a session, which, for example, includes, but is not limited to, a session number. In practical applications, flexible adjustment may be made according to some application scenarios.

In this embodiment, when the request corresponding to the prepared statement received by the receiving module 301 is a prepare request, the processing module 302 performing processing according to the received request corresponding to the prepared statement and a session identifier cached in a prepared statement cache library includes at least the following two situations.

Situation one: When the processing module 302 finds a session identifier corresponding to a current prepare request session in the prepared statement cache library, a response message of the prepare request is sent to the client.

It may be understood that, when the prepare request is received and the session identifier corresponding to the prepare request session is cached in the prepared statement cache library of the database proxy layer, that is, the processing module 302 finds the session identifier corresponding to the prepare request session in the prepared statement cache library, it indicates that the current prepare request has been processed. In this case, the response message of the prepare request is directly sent to the client, without the need to deliver the prepare request to the database, which saves the interaction between the client and the database and reduces the load of the database to some extent. It may be understood that the prepare request having been processed mentioned in this embodiment indicates that the prepare request has been sent to the database by the client once and a session has been successfully established. It is also to be clarified that the session corresponding to the session identifier cached in the prepared statement cache library in the database proxy layer is always connected to the database.

Situation two: When the processing module 302 does not find the session identifier corresponding to the current prepare request session in the prepared statement cache library, the prepare request is sent to the database, and the database performs processing and sends the response message of the prepare request to the client.

It may be understood that, when the prepare request is received but the session identifier corresponding to the prepare request session is not cached in the prepared statement cache library of the database proxy layer, that is, the processing module 302 cannot find the session identifier corresponding to the prepare request session in the prepared statement cache library, it indicates that the current prepare request is not processed. In this case, the prepare request still may be delivered to the database for further processing.

Figure 4:
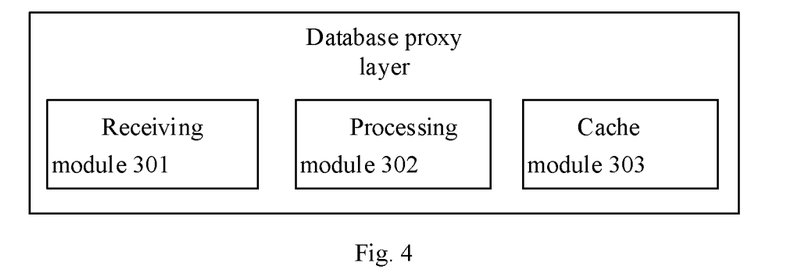
FIG. 4 is another structural schematic diagram of the database proxy layer according to an embodiment of the present disclosure.

In this embodiment, referring to FIG. 4, the database proxy layer further includes a cache module 303. After the processing module 302 sends the prepare request to the database and the database performs processing and sends the response message of the prepare request to the client, the cache module 303 caches the current prepare request session into the prepared statement cache library.

It may be understood that the session identifier in the prepared statement cache library of the database proxy layer is generally cached when the client sends it to the database for the first time and successfully establishes a session. In this way, when the client re-initiates the request corresponding to the prepared statement, the session identifier can be found in the prepared statement cache library of the database proxy layer, without the need to deliver the request corresponding to the prepared statement to the database, thereby saving an interaction operation between the client and the database. It is to be noted that the session identifier in the prepared statement cache library may also be cached when the client sends it to the database for the $N^{th}$ time and successfully establishes a session, where N is greater than 1. In practical applications, flexible adjustment is made by a developer according to an actual application scenario.

In some embodiments, after the processing module 302 sends the prepare request to the database and the database performs processing and sends the response message of the prepare request to the client, the cache module 303 caches the current prepare request session into the prepared statement cache library, so that the client only may interact with the database proxy layer a next time the client re-initiates the prepare request.

In this embodiment, when the request corresponding to the prepared statement received by the receiving module 301 is an execute request, the performing processing according to the received request corresponding to the prepared statement and a session identifier cached in a prepared statement cache library includes at least the following two situations.

Situation one: When the processing module 302 finds a session identifier corresponding to an idle prepare request session in the prepared statement cache library, the execute request is sent to the database, and the database performs processing and sends a response message of the execute request to the client.

It may be understood that, when the execute request is received and the session identifier corresponding to the idle prepare request session exists in the prepared statement cache library of the database proxy layer, that is, the processing module 302 finds the session identifier corresponding to the idle prepare request session in the prepared statement cache library, the execute request is sent to the database in this case, and the database performs processing and sends the response message of the execute request to the client.

Situation two: When the processing module 302 does not find the session identifier corresponding to the idle prepare request session in the prepared statement cache library, waiting is performed until an idle prepare request session is available, the execute request is sent to the database, and the database performs processing and sends the response message of the execute request to the client.

It may be understood that, when the execute request is received and the session identifier corresponding to the idle prepare request session does not exist in the prepared statement cache library of the database proxy layer, that is, the processing module 302 cannot find the session identifier corresponding to the idle prepare request session in the prepared statement cache library, and the execute request may be based on the prepare request which has been processed, in this case, waiting may be needed until the session identifier corresponding to the idle prepare request session is found in the prepared statement cache library.

Further, the execute request is sent to the database, and the database performs processing and sends the response message of the execute request to the client.

In this embodiment, the receiving module 301 is further configured to receive a result set or failure message generated after execution of the execute request by the database, and then the processing module 302 sends the result set or failure message to the client. It may be understood that the database executes the execute request, and sends the generated result set or failure message to the receiving module 301. The processing module 302 resends the result set or failure message to the client when the receiving module 301 receives the sent result set or failure message.

In this embodiment, when the request corresponding to the prepared statement received by the receiving module 301 is a deallocate request, the processing module 302 performs processing and sends a response message of the deallocate request to the client. It may be understood that the client may be disconnected from the database proxy layer as required. Therefore, the processing module 302 performs processing and sends the response message of the deallocate request to the client when the receiving module 301 receives the deallocate request.

In this embodiment, the processing module 302 deallocates a session corresponding to the prepared statement currently successfully established with the client, and sends the response message of the deallocate request to the client. In some embodiments, the processing module 302 may deallocate the prepare request session currently successfully established with the client, and the response message of the deallocate request is sent to the client, so as to further save resources.

In the database proxy layer according to the embodiment of the present disclosure, the receiving module receives a request corresponding to a prepared statement, and then the processing module performs processing according to the request corresponding to the prepared statement and a session identifier cached in a prepared statement cache library, where a session corresponding to the session identifier cached in the prepared statement cache library is a prepared statement session where a connection is successfully established between a client and a database, thereby solving the problem that performance and efficiency of distributed database preprocessing are low. That is, in the database proxy layer according to the embodiment of the present disclosure, a prepared statement session where a connection is successfully established between the client and the database is cached in the prepared statement cache library of the database proxy layer. The database proxy layer may perform processing according to the session identifier in the prepared statement cache library when receiving the request corresponding to the prepared statement, which prevents delivery of the prepared statement to the database by the client each time. Therefore, the database proxy layer according to the embodiment of the present disclosure reduces the load of the database greatly, improves the performance and efficiency of distributed database preprocessing greatly, and saves resources.

An embodiment of the present disclosure further provides a system, including a client, a database and the database proxy layer.

The client sends a request corresponding to a prepared statement to the database proxy layer.

The database proxy layer performs processing according to the received request corresponding to the prepared statement and a session identifier cached in a prepared statement cache library, where a session corresponding to the session identifier cached in the prepared statement cache library is a prepared statement session where a connection is successfully established between a client and a database.

The database maintains a connection to the session corresponding to the session identifier cached in the prepared statement cache library in the database proxy layer.

It is to be noted that, in order not to be redundant, all examples are not fully stated in this embodiment, and it should be made clear that all examples of the foregoing embodiments apply to this embodiment.

The system according to the embodiment of the present disclosure solves the problem that performance and efficiency of distributed database preprocessing are low. Therefore, the system according to the embodiment of the present disclosure reduces the load of the database to some extent, improves the performance and efficiency of distributed database preprocessing greatly, and saves resources.

An embodiment of the present disclosure further provides a non-transitory computer-readable storage medium storing one or more programs which, when executed by one or more processors, cause the one or more processors to perform the distributed database preprocessing method according to the embodiment of the present disclosure.

The storage medium includes volatile and nonvolatile, removable and non-removable media implemented in any method or technology for storing information (such as computer-readable instructions, data structures, computer program modules or other data). The storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage apparatuses, or any other medium used for storing desired information and accessible to a computer.

Apparently, those having ordinary skill in the art should understand that all or some of the steps of the method, functional modules/units in the system and the apparatus disclosed above may be implemented as software (which may be implemented using program code executable by a computing device), firmware, hardware and appropriate combinations thereof. In the hardware implementation, the division of the functional modules/units mentioned in the above description may not correspond to the division of physical components. For example, one physical component may have multiple functions, or one function or may be executed jointly by several physical components. Some or all physical components may be implemented as software executed by processors such as digital signal processors or microcontrollers, implemented as hardware, or implemented as integrated circuits such as application specific integrated circuits. Such software may be distributed on a computer-readable medium and executed by a computing device. Moreover, in some cases, the steps shown or described may be performed in sequences different from the sequences shown herein, and the computer-readable medium may include a computer storage medium (or a non-transitory medium) and a communication medium (or a transitory medium). As is known to those having ordinary skill in the art, the term, computer storage medium, includes volatile and nonvolatile, removable and non-removable media implemented in any method or technology for storing information (such as computer-readable instructions, data structures, program modules or other data). In addition, as is known to those having ordinary skill in the art, the communication medium generally includes computer-readable instructions, data structures, program modules or other data in modulated data signals such as carriers or other transmission mechanisms, and may include any information delivery medium. Therefore, the present disclosure is not limited to any specific combination of hardware and software.

The above are further detailed descriptions of the present disclosure in conjunction with specific embodiments, and it should be noted that the specific embodiments of the present disclosure are not limited to such descriptions. For those having ordinary skill in the art, several simple deductions or replacements may further be made without departing from the concept of the present disclosure, all of which should be considered within the protection scope of the present disclosure.

What is claimed is:

1. A distributed database preprocessing method, applied to a database proxy layer, the distributed database preprocessing method comprising:
  receiving a request corresponding to a prepared statement; and
  performing processing according to the request corresponding to the prepared statement and a session identifier cached in a prepared statement cache library,
  wherein a session corresponding to the session identifier cached in the prepared statement cache library is a prepared statement session where a connection is successfully established between a client and a database;
  wherein, in response to the received request corresponding to the prepared statement being an execute request, performing processing according to the request corresponding to the prepared statement and a session identifier cached in a prepared statement cache library comprises:
    in response to the session identifier corresponding to an idle prepare request session being found in the prepared statement cache library, sending the execute request to the database, and performing, by the database, processing and sending a response message of the execute request to the client.

2. The distributed database preprocessing method of claim 1, wherein, in response to the received request corresponding to the prepared statement being a prepare request, performing processing according to the request corresponding to the prepared statement and a session identifier cached in a prepared statement cache library comprises:
  in response to a session identifier corresponding to a current prepare request session being found in the prepared statement cache library, sending a response message of the prepare request to the client; and
  in response to the session identifier corresponding to the current prepare request session being not found in the prepared statement cache library, sending the prepare request to the database, and performing, by the database, processing and sending the response message of the prepare request to the client.

3. The distributed database preprocessing method of claim 2, wherein after sending the prepare request to the database, and performing, by the database, processing and sending the response message of the prepare request to the client, the method further comprises:
  caching the session identifier corresponding to the current prepare request session into the prepared statement cache library.

4. The distributed database preprocessing method of claim 1, wherein, in response to the received request corresponding to the prepared statement being an execute request, performing processing according to the request corresponding to the prepared statement and a session identifier cached in a prepared statement cache library further comprises:
  in response to the session identifier corresponding to the idle prepare request session being not found in the prepared statement cache library, waiting until an idle prepare request session is available, sending the execute request to the database, and performing, by the database, processing and sending the response message of the execute request to the client.

5. The distributed database preprocessing method of claim 4, wherein performing, by the database, processing and sending the response message of the execute request to the client comprises:
  receiving a result set or failure message generated after execution of the execute request by the database, and sending the result set or failure message to the client.

6. The distributed database preprocessing method of claim 5, wherein after sending the result set or failure message to the client, the method further comprises:
  in response to the received request corresponding to the prepared statement being a deallocate request, processing and sending a response message of the deallocate request to the client.

7. The distributed database preprocessing method of claim 6, wherein processing and sending a response message of the deallocate request to the client comprises:
  deallocating a session corresponding to the prepared statement currently established with the client, and sending the response message of the deallocate request to the client.

8. A database proxy layer, comprising a receiving hardware circuit and a processing hardware circuit,
  the receiving circuit being configured to receive a request corresponding to a prepared statement; and
  the processing circuit being configured to perform processing according to the request corresponding to the prepared statement and a session identifier cached in a prepared statement cache library,
  wherein a session corresponding to the session identifier cached in the prepared statement cache library is a prepared statement session where a connection is successfully established between a client and a database;
  wherein the processing circuit is configured to:
    in response to the session identifier corresponding to an idle prepare request session being found in the prepared statement cache library, send the execute request to the database, and perform, by the database, processing and send a response message of the execute request to the client.

9. The database proxy layer of claim 8, wherein the processing circuit is configured to:
  in response to a session identifier corresponding to a current prepare request session being found in the prepared statement cache library, send a response message of the prepare request to the client; and
  in response to the session identifier corresponding to the current prepare request session being not found in the prepared statement cache library, send the prepare request to the database, and perform, by the database, processing and send the response message of the prepare request to the client.

10. The database proxy layer of claim 9, further comprising a cache circuit configured to:
  cache the session identifier corresponding to the current prepare request session into the prepared statement cache library after the processing circuit sends the prepare request to the database and the database performs processing and sends the response message of the prepare request to the client.

11. The database proxy layer of claim 10, wherein the processing circuit is configured to:
   in response to the session identifier corresponding to the idle prepare request session being not found in the prepared statement cache library, wait until an idle prepare request session is available, send the execute request to the database, and perform, by the database, processing and send the response message of the execute request to the client.

12. A system, comprising a client, a database and a database proxy layer of claim 8;
   the client sending a request corresponding to a prepared statement to the database proxy layer;
   the database proxy layer performing processing according to the received request corresponding to the prepared statement and a session identifier cached in a prepared statement cache library, wherein a session corresponding to the session identifier cached in the prepared statement cache library is a prepared statement session where a connection is successfully established between a client and a database; and
   the database maintaining a connection to the session corresponding to the session identifier cached in the prepared statement cache library in the database proxy layer.

13. A non-transitory computer-readable storage medium, storing one or more programs which, when executed by one or more processors, cause the one or more processors to perform the distributed database preprocessing method of claim 1.

14. The distributed database preprocessing method of claim 2, wherein, in response to the received request corresponding to the prepared statement being an execute request, performing processing according to the request corresponding to the prepared statement and a session identifier cached in a prepared statement cache library further comprises:
   in response to the session identifier corresponding to the idle prepare request session being not found in the prepared statement cache library, waiting until an idle prepare request session is available, sending the execute request to the database, and performing, by the database, processing and sending the response message of the execute request to the client.

15. The distributed database preprocessing method of claim 3, wherein, in response to the received request corresponding to the prepared statement being an execute request, performing processing according to the request corresponding to the prepared statement and a session identifier cached in a prepared statement cache library further comprises:
   in response to the session identifier corresponding to the idle prepare request session being not found in the prepared statement cache library, waiting until an idle prepare request session is available, sending the execute request to the database, and performing, by the database, processing and sending the response message of the execute request to the client.

* * * * *